United States Patent
Kawazoe et al.

(10) Patent No.: US 10,153,506 B2
(45) Date of Patent: Dec. 11, 2018

(54) LIQUID COMPOSITION, PROCESS FOR ITS PRODUCTION, AND PROCESS FOR PRODUCING MEMBRANE-ELECTRODE ASSEMBLY FOR POLYMER ELECTROLYTE FUEL CELLS

(71) Applicant: ASAHI GLASS COMPANY, LIMITED, Tokyo (JP)

(72) Inventors: Hisao Kawazoe, Yokohama (JP); Eiji Endoh, Yokohama (JP); Hideki Nakagawa, Yokohama (JP); Shinji Terazono, Yokohama (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 15/071,863

(22) Filed: Mar. 16, 2016

(65) Prior Publication Data
US 2016/0197370 A1 Jul. 7, 2016

Related U.S. Application Data

(62) Division of application No. 13/948,288, filed on Jul. 23, 2013, now Pat. No. 9,331,354, which is a division of application No. 13/104,860, filed on May 10, 2011, now Pat. No. 8,546,004, which is a division of application No. 11/157,870, filed on Jun. 22, 2005, now Pat. No. 7,943,249.

(30) Foreign Application Priority Data

| Jun. 22, 2004 | (JP) | 2004-183712 |
| Jul. 12, 2004 | (JP) | 2004-204704 |
| Sep. 13, 2004 | (JP) | 2004-265176 |

(51) Int. Cl.
| H01M 8/10 | (2016.01) |
| H01M 8/1081 | (2016.01) |
| B01D 67/00 | (2006.01) |
| B01D 69/14 | (2006.01) |
| B01D 71/82 | (2006.01) |
| C08J 3/21 | (2006.01) |
| C08J 5/22 | (2006.01) |
| H01M 4/86 | (2006.01) |
| H01M 4/88 | (2006.01) |
| H01M 4/90 | (2006.01) |
| H01M 8/1004 | (2016.01) |
| H01M 8/1023 | (2016.01) |
| H01M 8/1025 | (2016.01) |
| H01M 8/1039 | (2016.01) |
| H01M 8/1051 | (2016.01) |
| H01M 8/1018 | (2016.01) |

(52) U.S. Cl.
CPC ....... H01M 8/1081 (2013.01); B01D 67/0011 (2013.01); B01D 69/141 (2013.01); B01D 71/82 (2013.01); C08J 3/212 (2013.01); C08J 5/2237 (2013.01); H01M 4/8605 (2013.01); H01M 4/8828 (2013.01); H01M 4/9016 (2013.01); H01M 8/1004 (2013.01); H01M 8/1023 (2013.01); H01M 8/1025 (2013.01); H01M 8/1039 (2013.01); H01M 8/1051 (2013.01); B01D 2325/16 (2013.01); B01D 2325/42 (2013.01); C08J 2327/18 (2013.01); H01M 2008/1095 (2013.01); Y02E 60/521 (2013.01); Y02P 70/56 (2015.11)

(58) Field of Classification Search
USPC .............................. 429/494; 427/115; 521/25
See application file for complete search history.

(56) References Cited

U.S. PATENT DOCUMENTS

| 5,472,799 A | 12/1995 | Watanabe |
| 5,840,192 A | 11/1998 | El Moussaoui et al. |
| 5,955,556 A | 9/1999 | McCarthy et al. |
| 6,221,248 B1 | 4/2001 | Lin et al. |
| 6,242,135 B1 | 6/2001 | Mushiake |

(Continued)

FOREIGN PATENT DOCUMENTS

| DE | 19946694 A1 | 6/2000 |
| DE | 10130828 A1 | 1/2003 |

(Continued)

OTHER PUBLICATIONS

Dennis E. Curtin, et al., "Advanced materials for improved PEMFC performance and life", Journal of Power Sources, 131, 2004, pp. 41-48.*

(Continued)

Primary Examiner — Mark Kaucher
Assistant Examiner — Henry Hu
(74) Attorney, Agent, or Firm — Foley & Lardner LLP

(57) ABSTRACT

An electrolyte membrane is prepared from a liquid composition comprising at least one member selected from the group consisting of trivalent cerium, tetravalent cerium, bivalent manganese and trivalent manganese; and a polymer with a cation-exchange group. The liquid composition is preferably one containing water, a carbonate of cerium or manganese, and a polymer with a cation-exchange group, and a cast film thereof is used as an electrolyte membrane to prepare a membrane-electrode assembly. The present invention successfully provides a membrane-electrode assembly for polymer electrolyte fuel cells being capable of generating the electric power in high energy efficiency, having high power generation performance regardless of the dew point of the feed gas, and being capable of stably generating the electric power over a long period of time.

19 Claims, No Drawings

(56) References Cited

U.S. PATENT DOCUMENTS

| | | | |
|---|---|---|---|
| 6,335,112 B1 | 1/2002 | Asukabe et al. | |
| 6,630,263 B1 | 10/2003 | McElroy | |
| 7,582,713 B2 | 9/2009 | Terada et al. | |
| 7,799,468 B2 | 9/2010 | Watakabe et al. | |
| 7,943,249 B2* | 5/2011 | Kawazoe | B01D 67/0011 427/115 |
| 8,546,004 B2* | 10/2013 | Kawazoe | B01D 67/0011 427/115 |
| 9,331,354 B2* | 5/2016 | Kawazoe | B01D 67/0011 |
| 2002/0009626 A1 | 1/2002 | Terazono et al. | |
| 2002/0093008 A1 | 7/2002 | Kerres et al. | |
| 2003/0008196 A1 | 1/2003 | Wessel et al. | |
| 2003/0008198 A1 | 1/2003 | Mukoyama et al. | |
| 2004/0043283 A1 | 3/2004 | Cipollini et al. | |
| 2004/0112754 A1* | 6/2004 | Thate | C25D 7/00 205/102 |
| 2005/0136308 A1 | 6/2005 | Andrews et al. | |
| 2005/0227132 A1 | 10/2005 | Hori et al. | |
| 2006/0063055 A1 | 3/2006 | Frey et al. | |
| 2006/0063903 A1 | 3/2006 | Kasahara et al. | |
| 2006/0099475 A1 | 5/2006 | Watanabe et al. | |
| 2006/0099476 A1* | 5/2006 | Watakabe | B01D 71/82 429/483 |
| 2006/0159972 A1 | 7/2006 | Nodono | |
| 2006/0199063 A1* | 9/2006 | Miura et al. | H01M 8/10 |
| 2006/0280985 A1* | 12/2006 | Toyoda | H01B 1/122 429/494 |
| 2007/0099053 A1 | 5/2007 | Frey et al. | |
| 2007/0104994 A1 | 5/2007 | Endoh et al. | |
| 2008/0118808 A1 | 5/2008 | Tayanagi et al. | |

FOREIGN PATENT DOCUMENTS

| | | |
|---|---|---|
| EP | 1 271 682 A2 | 1/2003 |
| EP | 1 662 595 A1 | 5/2006 |
| EP | 1 772 919 A1 | 4/2007 |
| JP | 06-103992 | 4/1994 |
| JP | 2000-106203 | 4/2000 |
| JP | 2000-231928 | 8/2000 |
| JP | 2001-118591 | 4/2001 |
| JP | 2001-185164 | 7/2001 |
| JP | 2002-231268 A | 8/2002 |
| JP | 2002-260705 A | 9/2002 |
| JP | 20003-086188 | 3/2003 |
| JP | 2003-123777 | 4/2003 |
| JP | 2003-183467 | 7/2003 |
| JP | 2004-018573 | 1/2004 |
| JP | 2004-075978 | 3/2004 |
| JP | 2004-134294 A | 4/2004 |
| JP | 2004-183712 A | 7/2004 |
| JP | 2004-204704 A | 7/2004 |
| JP | 2004-228192 A | 8/2004 |
| JP | 2004-260185 | 9/2004 |
| JP | 2004-265176 A | 9/2004 |
| JP | 2004-288620 | 10/2004 |
| JP | 2004-327074 | 11/2004 |
| JP | 2005-019232 | 1/2005 |
| JP | 2005-071760 | 3/2005 |
| JP | 2005-093233 | 4/2005 |
| JP | 2005-149859 | 6/2005 |
| JP | 2006-134678 | 5/2006 |
| JP | 2006-302600 | 11/2006 |
| JP | 4810868 | 11/2011 |
| WO | WO-03/083963 A2 | 10/2003 |
| WO | WO-2004/102714 | 11/2004 |
| WO | WO-2005/020357 | 3/2005 |
| WO | WO-2005/041330 A1 | 5/2005 |
| WO | WO-2005/060039 A1 | 6/2005 |
| WO | WO-2005/124912 A1 | 12/2005 |

OTHER PUBLICATIONS

Banerjee et al., "Nafion perfluorinated membranes in fuel cells", Journal of Fluorine Chemistry, 2004, 125:1211-1216.
Communication of Notice of Opposition dated Jul. 26, 2011, filed against European Patent No. 1772919, 18 pgs.
Czapski et al., "The kinetics of the oxidation of hydrogen peroxide by Cerium (IV)", Journal of Physical Chemistry, Jan. 1963, 67:201-203.
Ludvigsson et al., "Incorporation and characterization of oxides of manganese, cobalt, and lithium onto Nafion 117 membranes", J. Mater. chem., Feb. 2001, 11:1269-1276.
Mauritz et al., "State of Understanding of Nafion", Chem. Rev., 2004, 104:4535-4585.
New Energy and Industrial Technology Development Organization, Summary of debrief session for polymer electrolyte fuel cells research and development achievement:, 2000, Two cover pages and pp. 55-58.
Non-Final Office Action for U.S. Appl. No. 13/948,288 dated Jun. 4, 2015.
Non-Final Office Action for U.S. Appl. No. 11/157,870 dated Jul. 8, 2009.
Non-Final Office Action for U.S. Appl. No. 13/104,860 dated May 23, 2012.
Non-Final Office Action for U.S. Appl. No. 13/104,860 dated Oct. 10, 2012.
Notice of Allowance for U.S. Appl. No. 13/948,288 dated Dec. 23, 2015.
Notice of Allowance for U.S. Appl. No. 11/157,870 dated Feb. 25, 2011.
Notice of Allowance for U.S. Appl. No. 13/104,860 dated Jun. 4, 2013.
Notice of Opposition Against EP 05752908.3 (EP 1760812) dated Sep. 16, 2011.
Notice of Opposition against EP 05753377.0 (EP 1777767) dated Oct. 5, 2011.
Office Action for Japanese Application No. 2006-214452 dated Mar. 21, 2012.
Office Action in U.S. Appl. No. 11/157,870 dated Mar. 15, 2010.
Office Action for related U.S. Appl. No. 11/615,256 dated Jun. 8, 2009.
Office Action for related U.S. Appl. No. 12/007,418 dated May 12, 2009.
Official Action for Japanese Patent Application No. 2011-265695 dated Feb. 12, 2013.

* cited by examiner

LIQUID COMPOSITION, PROCESS FOR ITS PRODUCTION, AND PROCESS FOR PRODUCING MEMBRANE-ELECTRODE ASSEMBLY FOR POLYMER ELECTROLYTE FUEL CELLS

CROSS REFERENCE TO RELATED APPLICATIONS

The subject application is a Divisional Application of U.S. patent application Ser. No. 13/948,288, filed Jul. 23, 2013, now U.S. Pat. No. 9,331,354; which is a Divisional Application of application Ser. No. 13/104,860, filed May 10, 2011, now U.S. Pat. No. 8,546,004; which is a Divisional Application of U.S. application Ser. No. 11/157,870, filed Jun. 22, 2005, now U.S. Pat. No. 7,943,249; which claims priority from Japanese Patent Application No. 2004-183712 filed Jun. 22, 2004; Japanese Patent Application No. 2004-204704 filed Jul. 12, 2004; and Japanese Patent Application No. 2004-265176 filed Sep. 13, 2004. The subject matter of each of the above-referenced applications is incorporated in entirety by reference

TECHNICAL FIELD

The present invention relates to a process for producing a membrane-electrode assembly for polymer electrolyte fuel cells having a high initial output voltage and being capable of obtaining a high output voltage over a long period of time, and a liquid composition suitable therefor.

BACKGROUND ART

A fuel cell is a cell for converting a reaction energy of a gas as a raw material directly into an electric energy, and a hydrogen-oxygen fuel cell has little adverse effect on the global environment because in principle, its reaction product is water only. Among such fuel cells, with recently increasing social needs for energy and global environment problems, polymer electrolyte fuel cells using a polymer membrane as an electrolyte are greatly expected to be used as a power source for movable bodies such as electric vehicles and for small cogeneration systems because it can operate at ambient temperature and obtain a high power density by virtue of development of a polymer electrolyte membrane having a high ion conductivity.

The polymer electrolyte fuel cells normally employs a proton-conductive ion exchange membrane as a polymer electrolyte and, particularly, an ion exchange membrane composed of a perfluorocarbon polymer having sulfonic acid groups is excellent in basic properties. In the polymer electrolyte fuel cells, gas diffusible electrode layers are disposed on both sides of the ion exchange membrane, and a gas containing hydrogen as a fuel and a gas containing oxygen as an oxidizing agent (air or the like) are supplied to an anode and to a cathode, respectively, to generate electric power.

A reduction reaction of oxygen on the cathode of the polymer electrolyte fuel cells proceeds via hydrogen peroxide ($H_2O_2$) and this arouses concern about a possibility that hydrogen peroxide or a peroxide radical produced in a catalyst layer induces deterioration of the electrolyte membrane. Likewise, there is also concern that hydrogen peroxide or the peroxide radical is produced in the anode because of permeation of oxygen molecules from the cathode through the membrane. Particularly, in a case where a hydrocarbon membrane is used as the polymer electrolyte membrane, it lacks stability to the radical, and it was a problem in long-term operation.

For example, the polymer electrolyte fuel cells that was first put into practice was the one adopted as a power source for Gemini spaceship of U.S.A. At this time, a membrane composed of a sulfonated styrene-divinylbenzene polymer was used as the electrolyte membrane, but there was a problem of insufficient long-term durability. The known technologies to remedy this problem include a method of adding into the polymer electrolyte membrane a transition metal oxide or a compound with a phenolic hydroxide group which can catalytically decompose hydrogen peroxide (cf. Patent Document 1) and a method of making metal particles of a catalyst supported into a polymer electrolyte membrane to decompose hydrogen peroxide (cf. Patent Document 2). However, these technologies were those of decomposing hydrogen peroxide produced but were not attempts to suppress decomposition of the ion exchange membrane itself. Therefore, they showed an initial effect of improvement but still could have a serious problem in the long-term durability. In addition, there was a problem of rise in cost.

On the other hand, there are known ion exchange membranes composed of perfluorocarbon polymers having sulfonic acid groups, as polymers having far greater stability to the radical, as compared with the hydrocarbon polymers. Recently, the polymer electrolyte fuel cells using the ion exchange membrane composed of these perfluorocarbon polymers are expected as power sources for vehicles, a residential market, and so on, and there are increasing demands for practical applications thereof, which accelerates development. Since these applications require operation in particularly high efficiency, there are desires for operation at a higher voltage and for cost reduction. Furthermore, the operation is often required under low humidification or no humidification from the viewpoint of the efficiency of the whole fuel cell system.

However, even in the case of the fuel cells using the ion exchange membrane of the perfluorocarbon polymers having sulfonic acid groups, it is reported that the stability is very high in operation under high humidification, whereas the voltage degradation is significant in the operating condition under low humidification or no humidification (cf. Non-patent Document 1). Namely, it is considered that, in the case of the ion exchange membranes of the perfluorocarbon polymers having sulfonic acid groups, deterioration of the electrolyte membrane also proceeds due to hydrogen peroxide or the peroxide radical in the operating condition under low humidification or no humidification.

Furthermore, processes for producing the electrolyte membrane for fuel cells as described above include a process for forming a film by extrusion, a process for forming a film by casting with the use of a solution of a resin constituting the electrolyte membrane, and so on. The cast film formation is effective for cases where a large-scale thin film is industrially produced. Moreover, it is also reported that a liquid composition containing a rosin constituting a membrane such as the fluorocarbon polymer having sulfonic acid groups is used for production of a material for the membrane and is extremely useful for restoration, recovery and a coating material for a membrane already produced (for example, cf. Patent Document 3 and Patent Document 4).

Patent Document 1: JP-A-2001-118591 (Claim 1, page 2, lines 2 to 9)
Patent Document 2: JP-A-6-103992 (Means for Solving the Problems, page 2, lines 33 to 37)
Patent Document 3: JP-A-2003-183467 (page 2, lines 15 to 32)

Patent Document 4: JP-A-2004-75978 (page 5, lines 24 to 41)

Non-patent Document 1: Summary of debrief session for polymer electrolyte fuel cells research and development achievement in 2000 sponsored by New Energy and Industrial Technology Development Organization, page 56, lines 16 to 24

DISCLOSURE OF THE INVENTION

Problem to be Solved by the Invention

It is an object of the present invention to provide a membrane for polymer electrolyte fuel cells, which is capable of generating the electric power in sufficiently high energy efficiency, has a high power generating property and is capable of stably generating the electric power over a long period of time in both operation under low humidification or no humidification wherein a humidification temperature (dew point) of a feed gas is lower than a cell temperature, and operation under high humidification wherein humidification is carried out at a temperature near the cell temperature, in practical use of the polymer electrolyte fuel cells in the markets for vehicles, houses, and so on. Another object of the present invention is to provide a process for producing the membrane and a liquid composition useful for the process.

Means for Solving the Problems

The present invention provides a liquid composition comprising at least one member selected from the group consisting of trivalent cerium, tetravalent cerium, bivalent manganese and trivalent manganese; and a polymer with a cation-exchange group.

The above-mentioned composition also contains a liquid (solvent or dispersion medium) capable of dissolving or dispersing the polymer with the cation-exchange group. The solvent or dispersion medium may be, for example, alcohol or water. In the composition, cerium or manganese may be present in an ionic state or in a dispersed state as a compound such as an oxide or a hydroxide. In the case in which cerium or manganese is present in the ionic state, it may be ion-exchanged for a proton of the cation-exchange group of the polymer.

Furthermore, the present invention provides a process for producing the above-mentioned liquid composition, and the process comprises dissolving or dispersing the polymer with the cation-exchange group in a liquid and then mixing thereto at least one member selected from the group consisting of cerium compounds and manganese compounds. The term "liquid" referred to here represents a solvent or a dispersion medium.

The present invention also provides a process for producing a membrane obtained by cast film formation of the above-mentioned liquid composition, and a process for producing a membrane-electrode assembly for polymer electrolyte fuel cells comprising a cathode and an anode with a catalyst layer containing a catalyst and a polymer electrolyte, and a polymer electrolyte membrane disposed between the cathode and the anode, wherein the polymer electrolyte membrane is produced by the above-mentioned process for producing the membrane.

Furthermore, the present invention provides a process for producing a membrane-electrode assembly for polymer electrolyte fuel cells comprising a cathode and an anode with a catalyst layer containing a catalyst and a polymer electrolyte, and a polymer electrolyte membrane disposed between the cathode and the anode, and the process comprises dispersing the catalyst in the above-mentioned liquid composition and performing coating to form a catalyst layer of at least one of the cathode and the anode.

Effects of the Invention

The electrolyte membrane obtained according to the present invention has excellent resistance to hydrogen peroxide or the peroxide radical. A reason for this is not clear yet, but it is presumed that an interaction between the cerium ion (trivalent or tetravalent) or manganese ion (bivalent or trivalent) and a residue after dissociation of the proton from the cation-exchange group (e.g., —$SO_3^-$) effectively improves the resistance to hydrogen peroxide or the peroxide radical. Furthermore, even in a case where cerium or manganese is contained in a state of a cerium compound or a manganese compound in the membrane, it is considered that the interaction can occur between a cerium ion or a manganese ion produced by slight dissociation and —$SO_3^-$ or the like.

In addition, it is considered that the electrolyte membrane produced by the process of the present invention permits these ions or compounds to be simply, precisely and uniformly mixed in the membrane, as compared with such methods as one wherein an electrolyte membrane containing neither cerium nor manganese is immersed in a liquid containing these ions or compounds.

Since the electrolyte membrane of the present invention has the excellent resistance to hydrogen peroxide or the peroxide radical, a polymer electrolyte fuel cells comprising a membrane-electrode assembly with the electrolyte membrane of the present invention is excellent in durability and capable of generating the electric power stably over a long period of time.

BEST MODE FOR CARRYING OUT THE INVENTION

In the present invention there are no particular restrictions on the polymer with the cation-exchange group before inclusion of cerium or manganese as long as it possesses a function to produce a proton by dissociation of the cation-exchange group. Specific examples of the cation-exchange group include a sulfonic acid group, a sulfonimide group, a phosphonic acid group, a carboxylic acid group, a ketoimide group, and so on, among which the sulfonic acid group with a strong acidity and high chemical stability is particularly preferred. The present invention will be illustrated below using the polymer with sulfonic acid groups as an example.

The liquid composition of the present invention can be obtained by dissolving or dispersing a cerium or manganese compound in a solution in which the polymer with sulfonic acid groups is uniformly dissolved or dispersed. The cerium or manganese compound herein can be one soluble or insoluble in a solvent in the liquid composition, but a water-soluble salt thereof is preferably used in combination with water in order to ion-exchange the polymer with sulfonic acid groups and to make these components present more uniformly.

In a case where a water-soluble salt is used and where water is contained in the liquid composition, it is considered that cerium or manganese is present in an ionic state in the liquid composition and that the sulfonic acid group (—$SO_3H$) in the polymer is ion-exchanged with the cerium ion or manganese ion. Preferably, a cerium compound or manganese compound that is insoluble in water but soluble in another solvent is used as contained together with the other solvent in the liquid composition, because the cerium compound or manganese compound is uniformly present in a membrane resulting from coating of the liquid composition.

Furthermore, in a case using a cerium compound or manganese compound insoluble in the solvent in the liquid composition, it is necessary to uniformly and well disperse particles of these compounds in the liquid composition. In this case, therefore, it is preferable to prepare a dispersion liquid of the compound and to mix it with a solution or a dispersion liquid of the polymer with sulfonic acid groups, thereby preparing a liquid composition. It is also possible to preliminarily dissolve a soluble cerium or manganese salt in a solution or a dispersion liquid of the polymer with sulfonic acid groups, to add thereto a compound separately prepared, and to react it with the above soluble salt, whereby the liquid composition contains a reaction product.

The cerium compound as a raw material to be contained in the liquid composition may be one of various compounds including water-soluble cerium salts, water-insoluble cerium salts, insoluble compounds such as oxides and hydroxides, and so on. The valence of cerium is trivalent or tetravalent. Specific examples of salts containing the trivalent cerium ion include cerium acetate ($Ce(CH_3COO)_3 \cdot H_2O$), cerium chloride ($CeCl_3 \cdot 6H_2O$), cerium nitrate ($Ce(NO_3)_3 \cdot 6H_2O$), cerium sulfate ($Ce_2(SO_4)_3 \cdot 8H_2O$), cerium carbonate ($Ce_2(CO_3)_3 \cdot 8H_2O$) and so on. Specific examples of salts containing the tetravalent cerium ion include cerium sulfate ($Ce(SO_4)_2 \cdot 4H_2O$), di-ammonium cerium nitrate ($Ce(NH_4)_2(NO_3)_6$) and tetra-ammonium cerium sulfate ($Ce(NH_4)_4(SO_4)_4 \cdot 4H_2O$). In addition, examples of organic metal complexes include cerium acetylacetonate ($Ce(CH_3COCHCOCH_3)_3 \cdot 3H_2O$).

In a case where a water-soluble trivalent cerium salt is used, for example, if the sulfonic acid group is completely ion-exchanged with the cerium ion, $Ce^{3+}$ is bonded to three $-SO_3^-$. However, in the liquid composition according to the present invention, the sulfonic acid group does not have to be completely ion-exchanged. In the liquid composition according to the present invention, cerium may be contained in an ionic state or in a compound state. The same also applies to cases where the composition contains manganese instead of cerium.

A content of trivalent or tetravalent cerium in the liquid composition of the present invention is preferably from 0.3 to 30 mol % relative to the molarity of $-SO_3^-$ in the polymer with sulfonic acid groups (hereinafter this percentage will be referred to as "cerium content"). In the case of the cerium compound, the molar ratio based on cerium atoms is the cerium content. The content is more preferably from 0.7 to 20 mol %, still more preferably from 1 to 15 mol %.

If the cerium content is less than this range, adequate stability to hydrogen peroxide or the peroxide radical cannot be secured. On the other hand, if the content is more than the range, adequate conductivity of hydrogen ion cannot be secured, whereby the membrane resistance can increase to degrade the power generation property.

The manganese compound as a raw material to be contained in the liquid composition may be one of various compounds including water-soluble manganese salts, water-insoluble manganese salts, and insoluble compounds such as oxides and hydroxides. The valence of manganese is bivalent or trivalent. Specific examples of salts containing the bivalent manganese ion include manganese acetate ($Mn(CH_3COO)_2 \cdot 4H_2O$), manganese chloride ($MnCl_2 \cdot 4H_2O$), manganese nitrate ($Mn(NO_3)_2 \cdot 6H_2O$), manganese sulfate ($MnSO_4 \cdot 5H_2O$) and manganese carbonate ($MnCO_3 \cdot nH_2O$). Specific examples of salts containing the trivalent manganese ion include manganese acetate ($Mn(CH_3COO)_3 \cdot 2H_2O$). In addition, examples of organic metal complexes include manganese acetylacetonate ($Mn(CH_3COCHCOCH_3)_2$).

A content of the manganese ion or manganese compound in the liquid composition of the present invention is preferably from 0.5 to 45 mol % relative to the molarity of $-SO_3^-$ in the polymer with sulfonic acid groups (hereinafter this percentage will be referred to as "manganese content"). In the case of the manganese compound, the molar ratio based on manganese atoms is the manganese content. The content is more preferably from 1 to 30 mol %, still more preferably from 1.5 to 20 mol %.

If the manganese content is less than this range, adequate stability to hydrogen peroxide or the peroxide radical cannot be secured. On the other hand, if the content is more than the range, adequate conductivity of hydrogen ion cannot be secured, whereby the membrane resistance can increase to degrade the power generation property.

In production of the liquid composition according to the present invention, the cerium compound or manganese compound to be used is particularly preferably a carbonate. Many carbonates are generally sparingly soluble in water, but cerium carbonate or manganese carbonate is readily dissolved with generation of carbon dioxide when the solution or dispersion liquid of the polymer with sulfonic acid groups contains water. Furthermore, in a case where the liquid composition is prepared by using cerium or manganese carbonate, its coating is performed by a conventional cast method, and the solvent is removed by drying to obtain an electrolyte membrane, it is not necessary to wash the electrolyte membrane with water because no anion species remain except the $-SO_3^-$ group in the electrolyte membrane. The carbonate is preferable from this viewpoint of the production of the membrane as well.

There are no particular restrictions on the process for producing the liquid composition of the present invention and on the process for producing the electrolyte membrane using the liquid composition thus obtained, but the following method is applicable, for example. First, the polymer with sulfonic acid groups is dissolved or dispersed in a solvent. Water, and cerium carbonate or manganese carbonate are added to the solution and mixed thoroughly to obtain a liquid composition. Then the resultant liquid composition is cast to form a film and dried to obtain an electrolyte membrane.

An amount of water contained in the liquid composition is optionally determined depending on the ion exchange capacity and the concentration of the polymer with sulfonic acid groups and the amount of cerium or manganese to be added. Without use of water, dissolution of carbonate can take a considerable time, and thus the liquid composition preferably contains water, particularly, in use of carbonate.

There are no particular restrictions on the solid content of the liquid composition according to the present invention. The content and viscosity can be controlled so as to enable normal cast-coating, and from this viewpoint the solid content is preferably from 5 to 50%, particularly preferably from 10 to 35%, as a mass ratio to the total mass of the liquid composition.

The electrolyte membrane of the present invention can also take a laminated film structure and, for example, a laminated membrane can be made by laminating an ion exchange membrane containing no ion or compound of cerium or manganese on a membrane obtained by cast film formation of the liquid composition according to the present invention.

In the present invention there are no particular restrictions on the polymer with sulfonic acid groups before inclusion of cerium or manganese, and an ion exchange capacity thereof is preferably from 0.5 to 3.0 milliequivalent/g dry resin, more preferably from 0.7 to 2.5 milliequivalent/g dry resin, and particularly preferably from 1.0 to 2.5 milliequivalent/g dry resin. If the ion exchange capacity is too low, satisfactory conductivity of hydrogen ion cannot be secured when the sulfonic acid group is ion-exchanged with the cerium ion or manganese ion, whereby the membrane resistance can increase to degrade the power generation property. On the other hand, if the ion exchange capacity is too high, the water resistance and strength of the membrane can decrease. Furthermore, the polymer is preferably a fluoropolymer from the viewpoint of durability, and is particularly preferably a perfluorocarbon polymer with sulfonic acid groups (which may contain an oxygen atom of an ether bond type). There are no particular restrictions on the perfluorocarbon polymer, and the polymer is preferably a copolymer containing a polymerization unit based on a perfluorovinyl compound represented by $CF_2=CF-(OCF_2CFX)_m-O_p-(CF_2)_n-SO_3H$ (where m represents an integer of from 0 to 3, n represents an integer of from 1 to 12, p represents 0 or 1, and X represents a fluorine atom or a trifluoromethyl group) and a polymerization unit based on tetrafluoroethylene.

Specific preferred examples of the above perfluorovinyl compound include compounds represented by formulae (i) to (iii) below. In the following formulae, q represents an integer of from 1 to 8, r an integer of from 1 to 8, and t an integer of from 1 to 3.

(Formulae 1)

$$CF_2=CFO(CF_2)_q-SO_3H \quad (i)$$

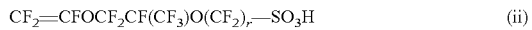

$$CF_2=CFOCF_2CF(CF_3)O(CF_2)_r-SO_3H \quad (ii)$$

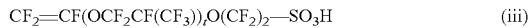

$$CF_2=CF(OCF_2CF(CF_3))_tO(CF_2)_2-SO_3H \quad (iii)$$

In a case where a perfluorocarbon polymer with sulfonic acid groups is used, the polymer may be one having a terminal group fluorinated by fluorination after polymerization. Where the polymer is fluorinated at its terminal, the stability to hydrogen peroxide or the peroxide radical is more enhanced, so as to improve the durability.

The polymer with sulfonic acid groups before inclusion of cerium or manganese may be a polymer other than the perfluorocarbon polymer with sulfonic acid groups. For example, such a polymer is preferably a polymer having a structure in which an aromatic ring is in the main chain of the polymer, or in the main chain and in a side chain and in which a sulfonic acid group is introduced in the aromatic ring, the polymer having an ion exchange capacity of from 0.5 to 3.0 milliequivalent/g dry resin. Specific examples of the polymer include the following polymers.

Sulfonated polyarylene, sulfonated polybenzoxazole, sulfonated polybenzothiazole, sulfonated polybenzoimidazole, sulfonated polysulfone, sulfonated polyether sulfone, sulfonated polyether ether sulfone, sulfonated polyphenylene sulfone, sulfonated polyphenylene oxide, sulfonated polyphenylene sulfoxide, sulfonated polyphenylene sulfide, sulfonated polyphenylene sulfide sulfone, sulfonated polyether ketone, sulfonated polyether ether ketone, sulfonated polyether ketone ketone, sulfonated polyimide, and so on.

The polymer electrolyte fuel cells with the electrolyte membrane according to the present invention has, for example, the following structure. Namely, the cell is equipped with membrane-electrode assemblies in each of which an anode and a cathode with a catalyst layer containing a catalyst and an ion exchange resin are disposed on both sides of the electrolyte membrane of the present invention. The anode and the cathode of the membrane-electrode assembly preferably have a gas diffusion layer made of carbon cloth, carbon paper, or the like disposed outside the catalyst layer (opposite to the membrane). Separators with grooves as paths for a fuel gas or an oxidizing agent gas are disposed oil both sides of each membrane-electrode assembly, a plurality of membrane-electrode assemblies are stacked through the separators to form a stack, and the cell is configured to supply a hydrogen gas to the anode side and to supply an oxygen gas or air to the cathode side. A reaction of $H_2 \rightarrow 2H^+ + 2e^-$ takes place on the anodes, and a reaction of $\frac{1}{2}O_2 + 2H^+ + 2e^- \rightarrow H_2O$ on the cathodes, whereby chemical energy is converted into electric energy.

Furthermore, the electrolyte membrane of the present invention is also applicable to direct methanol fuel cells in which methanol is supplied instead of the fuel gas to the anode side.

The above-mentioned catalyst layer can be obtained in accordance with conventional methods, for example, as follows. First, a conductive carbon black powder carrying particles of a platinum catalyst or a platinum alloy catalyst, is mixed in a solution of a perfluorocarbon polymer with sulfonic acid groups to obtain a uniform dispersion liquid, and gas diffusion electrodes are formed, for example, by any one of the following methods, thereby obtaining a membrane-electrode assembly.

The first method is a method of coating the both surfaces of the electrolyte membrane with the above-mentioned dispersion liquid, drying it, and then attaching two sheets of carbon cloth or carbon paper closely onto the both sides. The second method is a method of applying the above-mentioned dispersion liquid onto two sheets of carbon cloth or carbon paper, drying it, and then placing the two sheets on both sides of the above ion-exchange membrane while keeping the surfaces coated with the dispersion liquid is close contact with the ion-exchange membrane. The carbon cloth or carbon paper herein functions as gas diffusion layers to more uniformly diffuse the gas to the catalyst-containing layers, and functions as electricity collectors. Furthermore, another available method is such that a substrate separately prepared is coated with the above-mentioned dispersion liquid to make a catalyst layer, the catalyst layers are bonded to an electrolyte membrane by a method such as transcription, then the substrate is peeled off, and the electrolyte membrane is sandwiched between the above-mentioned gas diffusion layers.

There are no particular restrictions on the ion-exchange resin contained in the catalyst layer, and it is preferably a polymer with sulfonic acid groups, more preferably a perfluorocarbon polymer with sulfonic acid groups. The ion-exchange resin in the catalyst layer may contain cerium or manganese in an ionic state or in a compound state as the electrolyte membrane of the present invention. Such a resin can be applied not only to anodes but also to cathodes, and decomposition of the resin can be effectively suppressed, so as to further enhance the durability of the polymer electrolyte fuel cells. In another potential example, an ion-exchange resin containing neither cerium nor manganese may be used as the electrolyte membrane, and cerium or manganese is contained only in the ion-exchange resin in the catalyst layer.

In a case where the ion or compound of cerium or manganese is contained in the catalyst layer, the catalyst layer may be prepared in the same manner as above using a coating liquid in which a catalyst is dispersed in the liquid composition of the present invention. In this case, either the cathode or the anode can be prepared by using the liquid composition of the present invention, or both the cathode and the anode can be prepared by using the liquid composition. In this connection, the cathode and the anode can be made of their respective liquid compositions having different contents of cerium or manganese, so that the cathode and the anode are adjusted to have amounts of cerium or manganese different from each other. From the viewpoint of improvement in the durability, more preferably, the anode contains from 10 to 30 mol % of cerium and the cathode contains from 3 to 10 mol % of cerium, relative to the $-SO_3^-$ groups contained in the polymer with sulfonic acid groups, because it can effectively suppress decomposition of the ion-exchange resin in the catalyst layer.

From the same reason, in a case where the ion or compound of manganese is contained, preferably, the anode contains from 15 to 45 mol % of manganese and the cathode contains from 5 to 15 mol % of manganese, relative to the $-SO_3^-$ groups contained in the polymer with sulfonic acid groups. The content of a cerium or manganese herein, in the case of the cerium compound or the manganese compound, refers to a molar rate in terms of the molarity of cerium or manganese.

The electrolyte membrane obtained according to the present invention may be a membrane composed only of the polymer with sulfonic acid groups containing cerium or manganese in an ionic state or in a compound state, but it may contain another component. For example, a membrane reinforced by fiber, woven fabric, unwoven fabric, a porous material, or the like of another resin such as polytetrafluoroethylene (hereinafter referred to as "PTFE") or perfluoroalkylether can also be applied to the process for producing the membrane by use of the liquid composition of the present invention. In a case where the electrolyte membrane is reinforced, the whole membrane may be reinforced, or the circumference of the membrane may be reinforced in a frame-like shape with a film, a sheet or the like. If the membrane is reinforced in a frame-like shape, the strength around the circumference will increase to enhance handleability. The whole membrane may be reinforced with a reinforcing material having a high percentage of void and only the circumference may be reinforced with a reinforcing material having a low percentage of void or having no void.

The polymer electrolyte fuel cells comprising the membrane-electrode assembly obtained by the present invention is excellent in the durability even at a high temperature, and it can operate at 100° C. or higher to generate the electric power. In a case where the fuel gas is hydrogen obtained by reforming of methanol, natural gas, gasoline or the like, carbon monoxide, if contained even in a trace amount, will poison the electrode catalyst, to result in soon lowering the output power of the fuel cell. When the operative temperature is at least 100° C., it is possible to suppress the poisoning. The operative temperature is more preferably at least 120° C., which enhances the effect of suppressing the poisoning.

In addition, the liquid composition of the present invention is not only useful for preparation of the electrolyte membranes and catalyst layers for fuel cells, but also preferably applicable to membranes for electrolysis of water, various sensors such as humidity sensors, signal transfer media, and so on.

EXAMPLES

Now, the present invention will be described in further detail with reference to Examples (Examples 1 to 5, 8 to 11) and Comparative Examples (Examples 6 and 7), but it should be understood that the present invention is by no means restricted to such Examples.

[Preparation of Solution of Perfluorocarbon Polymer with Sulfonic Acid Groups]

300 g of a $CF_2=CF_2/CF_2=CFOCF_2CF(CF)O(CF_3)_2$ $SO_3H$ copolymer (ion exchange capacity: 1.1 milliequivalent/g dry resin), 420 g of ethanol and 280 g of water were charged in a 2 l autoclave, sealed hermetically, and mixed at 105° C. for 6 hours by means of a double helical blade to obtain a uniform liquid (hereinafter referred to as "Solution A"). The solid content of Solution A was 30 mass %.

[Preparation of Solution of Aromatic Polymer with Sulfonic Acid Groups]

60 g of granular polyether ether ketone commercially available (PEEK-450P manufactured by British Victrex Company) was added gradually to 1200 g of 98 mass % sulfuric acid at room temperature, and then stirred at room temperature for 60 hours, to obtain a uniform solution of a polymer in which sulfonic acid groups were introduced into polyether ether ketone. Then this solution was gradually dropwise added to 5 l of distilled water under cooling to precipitate polyether ether ketone with sulfonic acid groups, which was separated by filtration. Then the separated product was washed with distilled water until the washing liquid became neutral. Thereafter, it was dried under vacuum at 80° C. for 24 hours to obtain 48 g of polyether ether ketone with sulfonic acid groups. The ion exchange capacity was 1.6 milliequivalent/g dry resin.

Next, 40 g of polyether ether ketone with sulfonic acid groups thus obtained was dissolved in 360 g of N-methyl-2-pyrrolidone (NMP) to obtain a 10 mass % solution (hereinafter referred to as "Solution B").

Example 1

100 g of Solution A and 1.00 g of cerium carbonate hydrate ($Ce_2(CO_3)_3.8H_2O$) were charged in a 300 ml round-bottomed glass flask and stirred at room temperature for 8 hours with a meniscus blade made of polytetrafluoroethylene (PTFE). Bubbles due to generation of $CO_2$ were generated from the start of stirring, and a uniform transparent liquid composition was finally obtained (hereinafter referred to as "Liquid Composition C"). The solid content of Liquid Composition C thus obtained was 30.2 mass %. This composition was used for cast coating with a die coater on a 100 μm ethylene-tetrafluoroethylene copolymer (ETFE) sheet (commercial name: AFLEX100N manufactured by Asahi Class Company, Limited), followed by preliminary drying at 80° C. for 10 minutes, drying at 120° C. for 10 minutes and further annealing at 150° C. for 30 minutes to obtain a polymer electrolyte membrane with a thickness of 50 μm.

A membrane in a size of 5 cm×5 cm was cut out from this polymer electrolyte membrane and left in dry nitrogen for 16 hours, and then its mass was precisely weighed. The membrane was then immersed in a 0.1 N HCl aqueous solution to extract cerium ions completely therefrom, thereby obtaining a liquid. This liquid was subjected to an inductively-coupled plasma (ICP) emission spectrometry and cerium in the polymer electrolyte membrane was quantitatively determined. The amount of cerium was 1.5% relative to the mass of the membrane and the cerium content was 10 mol %.

Then 5.1 g of distilled water was mixed in 1.0 g of a catalyst powder (manufactured by N.E. CHEMCAT CORPORATION) in which platinum was supported on a carbon carrier (specific surface area: 800 $m^2/g$) so as to be contained in an amount of 50% of the whole mass of the catalyst. Mixed into the solution mixture was 5.6 g of a solution with a solid content of 9 mass % in which a $CF_2=CF_2/CF_2=CFOCF_2CF(CF_3)O(CF_2)_2SO_3H$ copolymer (ion exchange capacity: 1.1 milliequivalent/g dry resin) was dispersed in ethanol. This mixture was mixed and pulverized by means of a homogenizer (commercial name: POLYTRON manufactured by KINEMATICA) to prepare a coating liquid for forming a catalyst layer.

This coating liquid was applied onto a polypropylene substrate film with a bar coater and then dried in a drier at 80° C. for 30 minutes to prepare a catalyst layer. In addition, a mass of only the substrate film before formation of the catalyst layer and a mass of the substrate film after formation of the catalyst layer were measured, and an amount per unit area of platinum contained in the catalyst layer was calculated, and found to be 0.5 $mg/cm^2$.

Then, using the polymer electrolyte membrane containing cerium as described above, the catalyst layer formed on the above substrate film was disposed on each side of this membrane and the catalyst layers were transferred onto the membrane by a hot pressing, to obtain a membrane-catalyst layer assembly in which the anode catalyst layer and the cathode catalyst layer were bonded to respective sides of the polymer electrolyte membrane. Here the electrode area was 16 $cm^2$.

This membrane-catalyst layer assembly was sandwiched between two sheets of gas diffusion layers made of carbon cloth with a thickness of 350 μm to prepare a membrane-electrode assembly. This was built in a cell for generation of electric power and an open circuit voltage test (OCV test) was carried out as an acceleration test. The test was carried out as follows: hydrogen (utilization rate: 70%) and air (utilization rate: 40%) corresponding to a current density of 0.2 $A/cm^2$ were supplied under ordinary pressure to the anode and to the cathode, respectively; the cell temperature was set at 90° C., the dew point of the anode gas was set at 60° C. and the dew point of the cathode gas was set at 60° C.; the cell was operated for 100 hours in an open circuit state without generation of electric power and a voltage change was measured during the period. Furthermore, by supplying hydrogen to the anode and nitrogen to the cathode, amounts of hydrogen gas having leaked from the anode to the cathode through the membrane were analyzed before and after the test, thereby checking a degree of degradation of the membrane. Table 1 shows the results.

Next, a membrane-electrode assembly was prepared in the same manner as above and built in a cell for generation of electric power and a durability test thereof was carried out under an operating condition of low humidification. The test conditions were as follows: under ordinary pressure, hydrogen (utilization rate: 70%)/air (utilization rate: 40%) was supplied at a cell temperature of 80° C. and at a current density of 0.2 $A/cm^2$ and the polymer electrolyte fuel cells was evaluated as to the initial property and durability. Hydrogen and air was so humidified and supplied into the cell that the dew point on the anode side was 80° C. and that the dew point on the cathode side was 50° C., respectively, and a cell voltage at an initial stage of operation and a relation between elapsed time and cell voltage after the start of the operation were measured. Table 2 shows the results. In addition, a cell voltage at an initial stage of operation and a relation between elapsed time and cell voltage after the start of the operation were also measured in the same manner as above except that the dew point on the cathode side was changed to 80° C. in the above cell evaluation conditions. Table 3 shows the evaluation results.

Example 2

A membrane having a cerium content of 5 mol % was prepared in the same manner as in Example 1 except that the amount of cerium carbonate hydrate ($Ce_2(CO_3)_3.8H_2O$) was changed to 498 mg in Example 1. Then this membrane was used to obtain a membrane-catalyst layer assembly and further to obtain a membrane-electrode assembly in the same manner as in Example 1. This membrane-electrode assembly was subjected to the same evaluation tests as in Example 1 and provided the results as presented in Tables 1 to 3.

Example 3

A membrane having a cerium content of 1.7 mol % was prepared in the same manner as in Example 1 except that the amount of cerium carbonate hydrate ($Ce_2(CO_3)_3.8H_2O$) was changed to 166 mg in Example 1. Then this membrane was used to obtain a membrane-catalyst layer assembly and further to obtain a membrane-electrode assembly in the same manner as in Example 1. This membrane-electrode assembly was subjected to the same evaluation tests as in Example 1 and provided the results as presented in Tables 1 to 3.

Example 4

A membrane having a manganese content of 10 mol % was prepared in the same manner as in Example 1 except that 422 mg of manganese carbonate hydrate ($MnCO_3.nH_2O$, manganese content: from 41 to 46% of the total mass) was used instead of cerium carbonate hydrate used in Example 1. Then this membrane was used to obtain a membrane-catalyst layer assembly and further to obtain a membrane-electrode assembly in the same manner as in Example 1. This membrane-electrode assembly was subjected to the same evaluation tests as in Example 1 and provided the results as presented in Tables 1 to 3.

Example 5

100 g of Solution B, 20 g of water and 484 mg of cerium carbonate ($Ce_2(CO_3)_3.8H_2O$) were charged in a 300 ml round-bottomed glass flask and stirred at 70° C. for 8 hours with a meniscus blade made of PTFE. On the way of the stirring, bubbles due to generation of $CO_2$ were generated, and a uniform transparent solution was finally obtained. The solid content of this liquid composition was 8.3%. This composition was used to form a cast film on a PTFE substrate at room temperature and dried at 100° C. in a nitrogen atmosphere for 10 hours to evaporate NMP and water, thereby obtaining a membrane in a thickness of 50 μm. This membrane had the cerium content of 10 mol % according to the same ICP measurement as in Example 1.

Then this membrane was used to obtain a membrane-catalyst layer assembly and further to obtain a membrane-electrode assembly in the same manner as in Example 1. This membrane-electrode assembly was subjected to the same evaluation tests as in Example 1 and provided the results as presented in Tables 1 to 3.

Example 6

Solution A was used to form a cast film without any additional substance to obtain a polymer electrolyte membrane. A membrane-catalyst layer assembly and a membrane-electrode assembly were produced in the same manner as in Example 1 except that this membrane was used as the electrolyte membrane. This membrane-electrode assembly was subjected to the same evaluation tests as in Example 1 and provided the results as presented in Tables 1 to 3.

Example 7

A membrane-catalyst layer assembly and a membrane-electrode assembly were produced in the same manner as in Example 5 except that Solution B was used as it was, without adding cerium carbonate nor water in Example 5. This membrane-electrode assembly was subjected to the same evaluation as in Example 1 and provided the results as presented in Tables 1 to 3.

Example 8

A liquid composition was prepared in the same manner as in Example 1 except that 100 g of Solution A, 249 mg of cerium carbonate hydrate ($Ce_2(CO_3)_3 \cdot 8H_2O$) and 170 mg of manganese carbonate hydrate ($MnCO_3 \cdot nH_2O$, manganese content: from 41 to 46% of the total mass) were charged in Example 1, and the liquid composition was used to obtain a membrane containing 2.5 mol % of cerium and 3.75 mol % of manganese relative to the —$SO_3^-$ groups in the perfluorocarbon polymer in the membrane. Then this membrane was used to obtain a membrane-catalyst layer assembly and further to obtain a membrane-electrode assembly in the same manner as in Example 1. This membrane-electrode assembly was subjected to the same evaluation tests as in Example 1 and provided the results as presented in Tables 1 to 3.

Example 9

Solution A was used to form a cast film with a die coater on a 100 μm ETFE sheet (commercial name: AFLEX100N, manufactured by Asahi Glass Company, Limited), preliminarily dried at 80° C. for 10 minutes, dried at 120° C. for 10 minutes and further annealed at 150° C. for 30 minutes to obtain an electrolyte membrane in a film thickness of 50 μm and a size of 5 cm×5 cm.

Next, an anode catalyst layer was prepared using Liquid Composition C with the cerium content of 10 mol % prepared in Example 1, as follows. 5.1 g of distilled water was mixed in 1.0 g of a catalyst powder (manufactured by N.E. CHEMCAT CORPORATION) in which platinum was supported on a carbon carrier (specific surface area: 800 $m^2/g$) so as to be contained in an amount of 50% of the whole mass of the catalyst. Mixed into this solution mixture was 5.6 g of a liquid with a solid content of 9 mass % obtained by diluting the above Liquid Composition C with ethanol. This mixture was mixed and pulverized by means of a homogenizer to prepare a coating liquid for forming an anode catalyst layer.

This coating liquid was applied onto a polypropylene substrate film with a bar coater and then dried in a drier at 80° C. for 30 minutes to obtain an anode catalyst layer containing 10 mol % of cerium relative to the —$SO_3^-$ groups contained in the perfluorocarbon polymer in the catalyst layer. In addition, a mass of only the substrate film before formation of the catalyst layer and a mass of the substrate film after formation of the catalyst layer were measured, and an amount per unit area of platinum contained in the catalyst layer was calculated and found to be 0.5 mg/$cm^2$.

On the other hand, a cathode catalyst layer containing no cerium was prepared in the same manner as the anode catalyst layer was, except that the above Solution A was used instead of the above Liquid Composition C.

Then the anode catalyst layer and the cathode catalyst layer formed on the above substrate film were disposed on respective sides of the electrolyte membrane prepared using Solution A, and the catalyst layers were transferred onto the membrane by a hot pressing to obtain a membrane-catalyst layer assembly in which an anode catalyst layer containing 10 mol % of cerium relative to the —$SO_3^-$ groups contained in the perfluorocarbon polymer in the catalyst layer and a cathode catalyst layer containing no cerium were bonded to the respective sides of the polymer electrolyte membrane. Here the electrode area was 16 $cm^2$.

This membrane-catalyst layer assembly was used to obtain a membrane-electrode assembly in the same manner as in Example 1. This membrane-electrode assembly was subjected to the same open circuit voltage test as in Example 1. Table 1 shows the results. Furthermore, the same membrane-electrode assembly as above was prepared and built in a cell for generation of electric power, and a durability test was carried out under the same operating conditions of low humidification and high humidification as in Example 1 and to obtain the results as presented in Tables 2 and 3.

Example 10

A liquid composition having a cerium content of 20 mol % was prepared in the same manner as in Example 1, except that 2.00 g of cerium carbonate hydrate ($Ce_2(CO_3)_3 \cdot 8H_2O$) was charged in the preparation of Liquid Composition C in Example 1. A membrane-catalyst layer assembly in which an anode catalyst layer containing 20 mol % of cerium relative to the —$SO_3^-$ groups contained in the perfluorocarbon polymer in the catalyst layer and a cathode catalyst layer containing no cerium were bonded to respective sides of the polymer electrolyte membrane was produced in the same manner as in Example 9, except that the foregoing liquid composition was used for preparation of the anode catalyst layer.

This membrane-catalyst layer assembly was used to obtain a membrane-electrode assembly in the same manner as in Example 1. This membrane-electrode assembly was subjected to the same open circuit voltage test as in Example 1. Table 1 shows the results. Furthermore, the same membrane-electrode assembly as above was prepared and built in a cell for generation of electric power, and a durability test was carried out under the same operating conditions of low humidification and high humidification as in Example 1 and to obtain the results as presented in Tables 2 and 3.

Example 11

A liquid composition having a manganese content of 20 mol % was prepared in the same manner as in Example 1, except that 844 mg of manganese carbonate hydrate ($MnCO_3 \cdot nH_2O$, manganese content: from 41 to 46% of the total mass) was charged in the preparation of Liquid Composition C in Example 1. A membrane-catalyst layer assembly in which anode catalyst layer containing 20 mol % of manganese relative to the —$SO_3^-$ groups contained in the perfluorocarbon polymer in the catalyst layer and a cathode catalyst layer containing no manganese were bonded to respective sides of the polymer electrolyte membrane was produced in the same manner as in Example 8, except that the foregoing liquid composition was used for preparation of the anode catalyst layer.

This membrane-catalyst layer assembly was used to obtain a membrane-electrode assembly in the same manner as in Example 1. This membrane-electrode assembly was subjected to the same evaluation tests as in Example 1 and to obtain the results as presented in Tables 1 to 3.

TABLE 1

|  | Open circuit voltage (V) | | hydrogen leak (ppm) | |
| --- | --- | --- | --- | --- |
|  | Initial | After 100 hours | Initial | After 100 hours |
| Example 1 | 0.99 | 0.98 | 710 | 720 |
| Example 2 | 0.99 | 0.96 | 700 | 710 |
| Example 3 | 0.97 | 0.96 | 730 | 780 |
| Example 4 | 0.97 | 0.94 | 750 | 790 |
| Example 5 | 0.96 | 0.92 | 850 | 1100 |
| Example 6 | 0.96 | 0.75 | 1100 | 12000 |
| Example 7 | 0.94 | 0.51 | 1300 | 70000 |
| Example 8 | 0.99 | 0.98 | 750 | 790 |
| Example 9 | 0.99 | 0.96 | 710 | 720 |
| Example 10 | 0.99 | 0.98 | 700 | 710 |
| Example 11 | 0.99 | 0.97 | 730 | 780 |

TABLE 2

|  | Initial output voltage (V) | Durability/output voltage (V) | |
| --- | --- | --- | --- |
|  |  | After 500 hours | After 2000 hours |
| Example 1 | 0.77 | 0.77 | 0.76 |
| Example 2 | 0.77 | 0.76 | 0.76 |
| Example 3 | 0.76 | 0.75 | 0.75 |
| Example 4 | 0.76 | 0.75 | 0.74 |
| Example 5 | 0.75 | 0.73 | 0.72 |
| Example 6 | 0.77 | 0.70 | 0.65 |
| Example 7 | 0.73 | 0.58 | 0.50 |
| Example 8 | 0.76 | 0.76 | 0.76 |
| Example 9 | 0.77 | 0.76 | 0.75 |
| Example 10 | 0.77 | 0.76 | 0.76 |
| Example 11 | 0.76 | 0.75 | 0.75 |

TABLE 3

|  | Initial output voltage (V) | Durability/output voltage (V) | |
| --- | --- | --- | --- |
|  |  | After 500 hours | After 2000 hours |
| Example 1 | 0.78 | 0.78 | 0.78 |
| Example 2 | 0.78 | 0.78 | 0.77 |
| Example 3 | 0.78 | 0.77 | 0.77 |
| Example 4 | 0.78 | 0.77 | 0.77 |
| Example 5 | 0.76 | 0.75 | 0.74 |
| Example 6 | 0.77 | 0.73 | 0.70 |
| Example 7 | 0.74 | 0.65 | 0.60 |
| Example 8 | 0.78 | 0.77 | 0.77 |
| Example 9 | 0.78 | 0.77 | 0.76 |
| Example 10 | 0.78 | 0.77 | 0.76 |
| Example 11 | 0.78 | 0.77 | 0.77 |

It is seen from the above results of Examples and Comparative Examples that the open circuit voltage test (OCV test) under the high temperature and low humidification conditions as an acceleration test resulted in deterioration of the conventional electrolyte membranes and increase of hydrogen leak, but exhibited the dramatically excellent durability of the electrolyte membranes of the present invention.

INDUSTRIAL APPLICABILITY

The electrolyte membrane obtained from the electrolyte liquid composition according to the present invention is extremely excellent in durability to hydrogen peroxide or the peroxide radical formed by generation of electric power of the fuel cell. Accordingly, the polymer electrolyte fuel cells equipped with the membrane-electrode assembly having the electrolyte membrane according to the present invention shows the satisfactory durability over a long period of time in the both cases of generation of electric power under low humidification and under high humidification.

The entire disclosure of Japanese Patent Application No. 2004-183712 filed on Jun. 22, 2004, Japanese Patent Application No. 2004-204704 filed on Jul. 12, 2004 and Japanese Patent Application No. 2004-265176 filed on Sep. 13, 2004 including specifications, claims and summaries are incorporated herein by reference in their entireties.

What is claimed is:

1. A process for producing a membrane, which comprises performing cast film formation of a liquid composition comprising at least one member selected from the group consisting of trivalent cerium, tetravalent cerium, bivalent manganese and trivalent manganese; a polymer having a cation-exchange group; and a solvent or dispersion medium.

2. The process for producing a membrane according to claim 1, wherein the liquid composition is obtained by dissolving or dispersing the polymer having the cation-exchange group in the solvent or dispersion medium, and then dissolving therein the at least one member selected from the group consisting of cerium compounds and manganese compounds.

3. The process for producing a membrane according to claim 2, wherein the solvent or dispersion medium comprises water.

4. The process for producing a membrane according to claim 3, wherein the cation-exchange group is sulfonic acid group.

5. The process for producing a membrane according to claim 2, wherein the at least one member selected from the group consisting of cerium compounds and manganese compounds is a water-soluble salt.

6. The process for producing a membrane according to claim 2, wherein the cation-exchange group is sulfonic acid group.

7. The process for producing a membrane according to claim 6, wherein at least one of the trivalent cerium, the tetravalent cerium, the bivalent manganese or the trivalent manganese is present in an ionic state.

8. The process for producing a membrane according to claim 7, wherein the manganese ion is contained in an amount of from 0.5 to 45 mol % relative to the molarity of —$SO_3^-$ in the polymer, in the liquid composition.

9. The process for producing a membrane according to claim 7, wherein the cerium ion is contained in an amount of from 0.3 to 30 mol % relative to the molarity of —$SO_3^-$ in the polymer, in the liquid composition.

10. The process for producing a membrane according to claim 1, wherein the polymer is a perfluorocarbon polymer with sulfonic acid groups wherein the backbone or side chain may contain an oxygen atom of an ether bond type.

11. A process for producing a membrane, which comprises performing cast film formation of a liquid composition comprising at least one member selected from the group consisting of trivalent cerium and tetravalent cerium; a polymer having a cation-exchange group; and a solvent or dispersion medium.

12. The process for producing a membrane according to claim 11, wherein the liquid composition is obtained by dissolving or dispersing the polymer having the cation-exchange group, and then dissolving therein the at least one member selected from the group consisting of trivalent cerium and tetravalent cerium.

13. The process for producing a membrane according to claim 12, wherein the liquid composition is obtained by dissolving or dispersing the polymer with the cation-exchange group in a liquid containing water, and then dissolving therein a carbonate of cerium.

14. The process for producing a membrane according to claim 13, wherein the cation-exchange group is sulfonic acid group.

15. The process for producing a membrane according to claim 12, wherein the at least one member selected from the group consisting of trivalent cerium and tetravalent cerium is a water-soluble salt.

16. The process for producing a membrane according to claim 12, wherein the cation-exchange group is sulfonic acid group.

17. The process for producing a membrane according to claim 16, wherein at least one of the trivalent cerium or the tetravalent cerium is present in an ionic state.

18. The process for producing a membrane according to claim 17, wherein the cerium ion is contained in an amount of from 0.3 to 30 mol % relative to the molarity of —$SO_3^-$ in the polymer, in the liquid composition.

19. The process for producing a membrane according to claim 11, wherein the polymer is a perfluorocarbon polymer with sulfonic acid groups which may contain an oxygen atom of an ether bond type.

* * * * *